United States Patent
Aggarwal et al.

(10) Patent No.: US 11,297,067 B2
(45) Date of Patent: Apr. 5, 2022

(54) RESOURCE APPROPRIATION IN A MULTI-TENANT ENVIRONMENT USING RISK AND VALUE MODELING SYSTEMS AND METHODS

(71) Applicant: Citrix Systems, Inc., Fort Lauderdale, FL (US)

(72) Inventors: Alok Aggarwal, Portland, OR (US); Josh Thomas Gray, Washington County, OR (US); Darren Gilroy, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 266 days.

(21) Appl. No.: 16/410,609

(22) Filed: May 13, 2019

(65) Prior Publication Data
US 2020/0366682 A1 Nov. 19, 2020

(51) Int. Cl.
H04L 29/06 (2006.01)

(52) U.S. Cl.
CPC ............................ *H04L 63/105* (2013.01)

(58) Field of Classification Search
CPC ..... H04L 63/105; H04L 47/70; H04L 47/822; H04L 47/808; H04L 47/805; H04L 47/80; H04L 47/12
USPC .......................................................... 726/4
See application file for complete search history.

(56) References Cited

U.S. PATENT DOCUMENTS

| | | | |
|---|---|---|---|
| 8,909,744 B2 * | 12/2014 | Rathore | G06Q 10/00 709/220 |
| 2012/0102193 A1 * | 4/2012 | Rathore | G06F 16/119 709/224 |
| 2015/0271145 A1 * | 9/2015 | Jalisatgi | H04L 67/42 713/168 |
| 2016/0134619 A1 * | 5/2016 | Mikheev | H04L 63/0884 726/8 |
| 2017/0251013 A1 * | 8/2017 | Kirti | H04L 63/1441 |
| 2018/0255099 A1 * | 9/2018 | Chen | H04L 67/10 |

OTHER PUBLICATIONS

Maintaining SLOs of Cloud-Native Applications Via Self-Adaptive Resource Sharing, Podolskiy et al, Jan. 2019 (Year: 2019).*

* cited by examiner

*Primary Examiner* — Jahangir Kabir
(74) *Attorney, Agent, or Firm* — Foley & Lardner LLP

(57) ABSTRACT

Described embodiments provide systems and methods for resource appropriation in a multi-tenant environment using risk and value modeling. A resource server can provide a plurality of applications access to a plurality of resources in response to requests from clients based in part on risk scores and value scores. The resource server can generate and execute a risk model and a value model to determine a risk score and a value score for each of the applications. The resource server can use the risk and value scores to determine access to a particular resource for a requested application. The resource server can assign a first allocation of resource tokens to an application. The resource tokens can correspond to access privileges to plurality of resources. The resource server can dynamically modify the resource allocation for applications responsive to changes to a risk score or value score of a respective application.

20 Claims, 6 Drawing Sheets

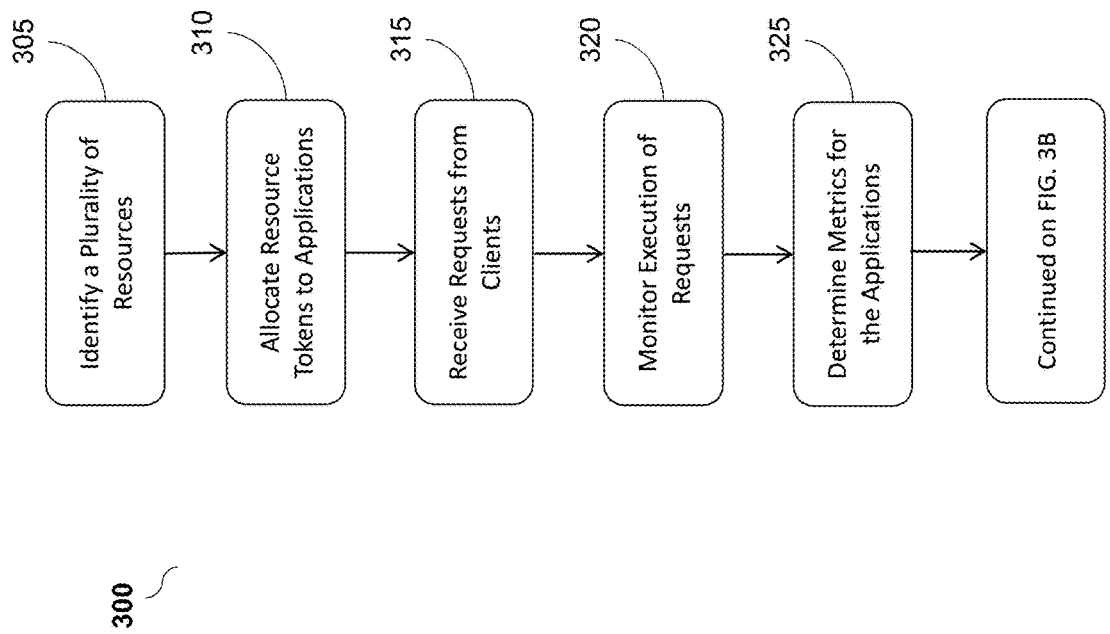

RESOURCE APPROPRIATION IN A MULTI-TENANT ENVIRONMENT USING RISK AND VALUE MODELING SYSTEMS AND METHODS

BACKGROUND

In network environments, files and other content can be made available to a plurality of users of the respective network. The files and content can be shared by the users such that different instances of the files and content can execute on a server and serve or provide access to a plurality of users at the same time or concurrently. However, the availability of different files and content can be limited by the resources of the network to provide concurrent access to a predetermined number of users.

SUMMARY

Systems and method for resource appropriation in a multi-tenant environment using risk and value modeling are provided herein. A resource server can execute within the multi-tenant environment to provide a plurality of applications access to a plurality of resources in response to requests from clients of the multi-tenant environment based in part on risk scores and value scores. For example, the resource server can generate and execute a risk model and a value model to determine a risk score and a value score for each of the applications. The resource server can receive a plurality of requests from clients for one or more applications. The resource server can use the risk and value scores to determine access to a particular resource or a level of access to a particular resource for a requested application. The resources of the multi-tenant environment can include processor execution time, memory allocation, bandwidth allocation or performance data. Thus, the resource server can incorporate a relative value and risk context of particular applications (e.g., tenants) into dynamic resource allocation and delivery system. The risk modeling can be propagated to multiple points (e.g., devices, clients) throughout the multi-tenant environment such that riskier applications (e.g., tenants) are provided less resources for execution/storage/bandwidth in the multi-tenant environment as compared to applications with lower risk scores or higher value scores. The resource server can dynamically modify the resource allocation for each of the applications responsive to changes to a risk score and/or value score to provide appropriation of resources amongst a multitude of tenants with varying and dynamic risk profiles.

In embodiments, the multi-tenant environment can include a plurality of applications (e.g., customer routing applications, customer routing policies) that share tenancy across a plurality of servers. In some embodiments, multiple instances of an application can be active per client (e.g., customer) at different points in time and applications on behalf of a plurality of customers can be simultaneously active. As new clients join the multi-tenant environment or are acquired, the application policies directed to scheduling and resource management for shared resources can be modified based on needs or requests of the new clients. For example, the resource server can execute the risk and value modules to determine new risk and value scores for each of the applications based in part on the change in the clients of the multi-tenant environment. In some embodiments, and based in part on an operation context of a new client, the demands, risk scores and value scores for different applications can be modified.

The resource server can use a variety of different data points to model and generate risk scores and value scores for an application. The resource server can use inputs such as, but not limited to, behavior over time, properties of client requests, consistency with access to patterns to other client and/or applications, and/or resource utilization patterns in fulfilling requests to model and generate risk scores and value scores for an application. The inputs to the risk model and value model can be dynamically changed to provide a resource scheduling algorithm that determines and defines resource polices (e.g., resource parameters) under which subsequent requests can be addressed.

In at least one aspect, this disclosure is directed to a method for resource appropriation in a multi-tenant computing environment. The method can include assigning, by a server, a first allocation of resource tokens to an application of a plurality of applications in a multi-tenant computing environment. The resource tokens can correspond to access privileges to a plurality of resources of the multi-tenant computing environment allocated to the application. The multi-tenant computing environment can receive a plurality of requests from a plurality of clients for the plurality of applications. The method can include monitoring, by the server, requests executed by the application using the resource tokens and the plurality of resources corresponding to the resource tokens. The requests can be received by one or more clients of the plurality of clients. The method can include determining, by the server, metrics corresponding to the requests executed by the application. The metrics can include characteristics of the requests and characteristics of execution by the application. The method can include generating, by the server, a risk model to identify a risk score for the application using the request characteristics and the execution characteristics. The method can include generating, by the server, a value model to identify a value score for the application using properties of the application and properties of the one or more clients of the plurality of clients that generated the requests. The method can include using, by the server, the risk model and the value model to determine and provide a second allocation of the resource tokens for the application. A difference between the first allocation and the second allocation can correspond to a difference between the risk score generated by the risk model and the value score generated by the value model.

In some embodiments, the method can include mapping, by the server, each of the resource tokens to at least one resource of the plurality of resources. The method can include determining, by the server, the metrics corresponding to the requests executed by the application in real-time. The method can include determining a processing duration value and a memory utilization profile for the application corresponding to the requests executed by the application, and generating a request history profile for the application. The method can include generating a client application profile for the application corresponding to a listing of clients interacting with the application. The method can include generating, by the server, a resource token usage profile for each of the plurality of resource tokens, and providing, by the server, the resource token usage profile for the resource tokens as at least one input for the risk model. The method can include determining the metrics corresponding to the requests over a predetermined time period, aggregating the metrics for the predetermined time period into a data set, and providing the data set as an input to the risk model to identify the risk score for the application based on the predetermined time period.

In some embodiments, the method can include identifying, by the server, the properties of the one or more clients of the plurality of clients from a client database. The properties can include at least one of: an importance score for a respective client, an account type of the respective client, and a resiliency profile for the respective client. The method can include dynamically increasing the value of the second allocation of resource tokens for the application responsive to an increase in the value score provided by the value model. The method can include dynamically decreasing the value of the second allocation of resource tokens for the application responsive to an increase in the risk score provided by the risk model.

In some embodiments, the method can include determining, by the server, that the risk score for the application is less than a risk threshold for the multi-tenant computing environment, and modifying, by the server, the value of the second allocation of resource tokens for the application responsive to the determination. The method can include determining, by the server, that the value score for the application is greater than a value threshold for the multi-tenant computing environment, and modifying, by the server, the value of the second allocation of resource tokens for the application responsive to the determination.

In at least one aspect, this disclosure is directed to a system for resource appropriation in a multi-tenant computing environment. The system can include a server having one or more processors, coupled to memory. The server can be configured to assign a first allocation of resource tokens to an application of a plurality of applications in a multi-tenant computing environment. The resource tokens can correspond to access privileges to a plurality of resources of the multi-tenant computing environment allocated to the application. The multi-tenant computing environment can receive a plurality of requests from a plurality of clients for the plurality of applications. The server can be configured to monitor requests executed by the application using the resource tokens and the plurality of resources corresponding to the resource tokens. The requests can be received by one or more clients of the plurality of clients. The server can be configured to determine metrics corresponding to the requests executed by the application. The metrics can include characteristics of the requests and characteristics of execution by the application. The server can be configured to generate a risk model to identify a risk score for the application using the request characteristics and the execution characteristics. The server can be configured to generate a value model to identify a value score for the application using properties of the application and properties of the one or more clients of the plurality of clients that generated the requests. The server can be configured to use the risk model and the value model to determine and provide a second allocation of the resource tokens for the application. A difference between the first allocation and the second allocation can correspond to a difference between the risk score generated by the risk model and the value score generated by the value model.

In some embodiments, the server can be configured to determine a processing duration value and a memory utilization profile for the application corresponding to the requests executed by the application, and generate a request history profile for the application. The server can be configured to generate a client application profile for the application corresponding to a listing of clients interacting with the application. The server can be configured to generate a resource token usage profile for each of the plurality of resource tokens, and provide the resource token usage profile for the resource tokens as at least one input for the risk model. The server can be configured to identify the properties of the one or more clients of the plurality of clients from a client database. The properties can include at least one of: an importance score for a respective client, an account type of the respective client, and a resiliency profile for the respective client.

In some embodiments, the server can be configured to dynamically increase the value of the second allocation of resource tokens for the application responsive to an increase in the value score provided by the value model. The server can be configured to dynamically decrease the value of the second allocation of resource tokens for the application responsive to an increase in the risk score provided by the risk model. The server can be configured to determine that the risk score for the application is less than a risk threshold for the multi-tenant computing environment, and modify the value of the second allocation of resource tokens for the application responsive to the determination. The server can be configured to determine that the value score for the application is greater than a value threshold for the multi-tenant computing environment, and modify the value of the second allocation of resource tokens for the application responsive to the determination.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIGS. 3A-3C are a flow diagram of a method for resource appropriation in a multi-tenant environment using risk scores and value scores.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes methods and systems for resource appropriation in a multi-tenant environment using risk scores and value scores.

A. Computing Environment

Prior to discussing the specifics of embodiments of the systems and methods of < >, it may be helpful to discuss the computing environments in which such embodiments may be deployed.

Figure 1A:
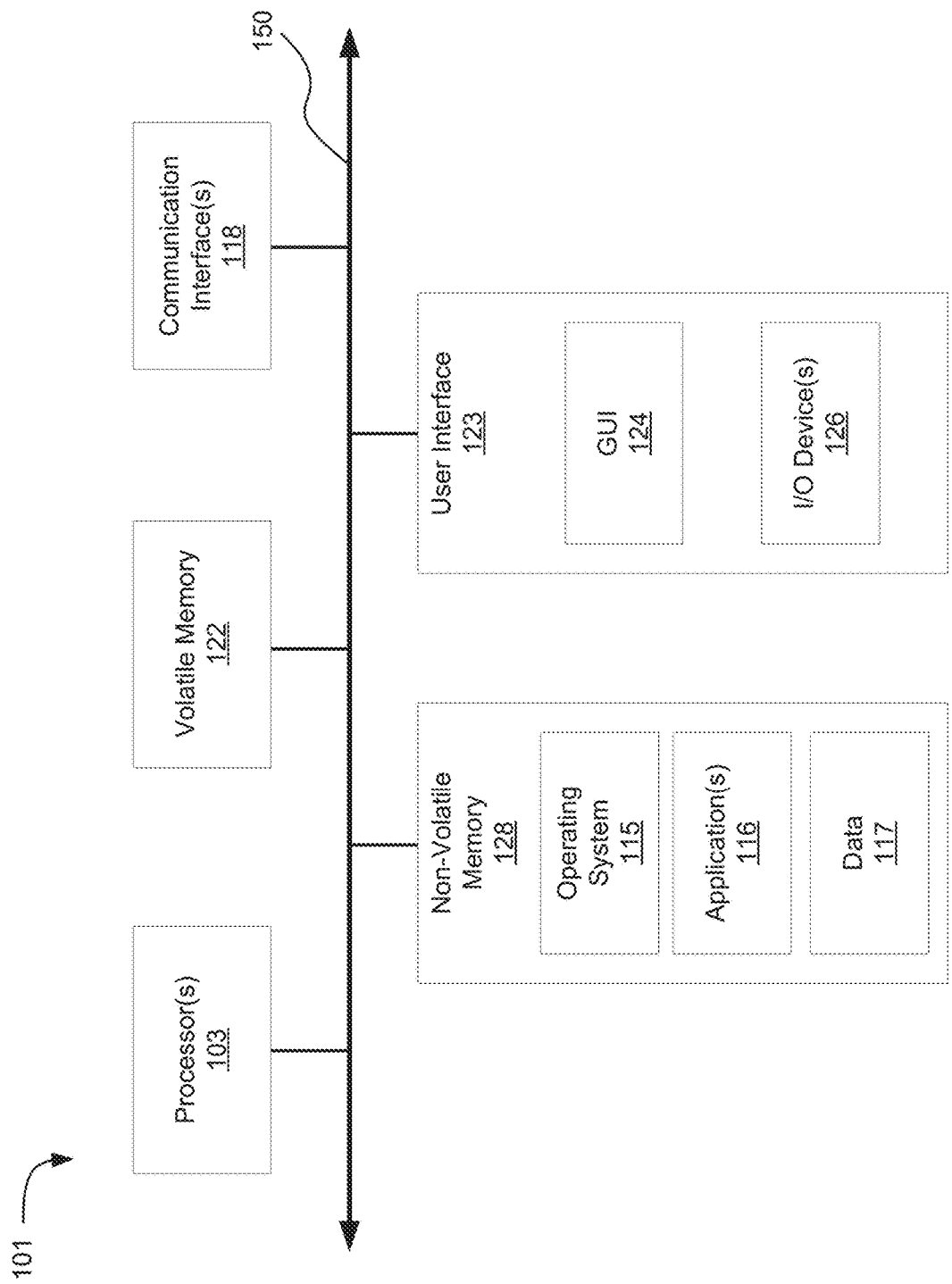
FIG. 1A is a block diagram of embodiments of a computing device.

As shown in FIG. 1A, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

Figure 1B:
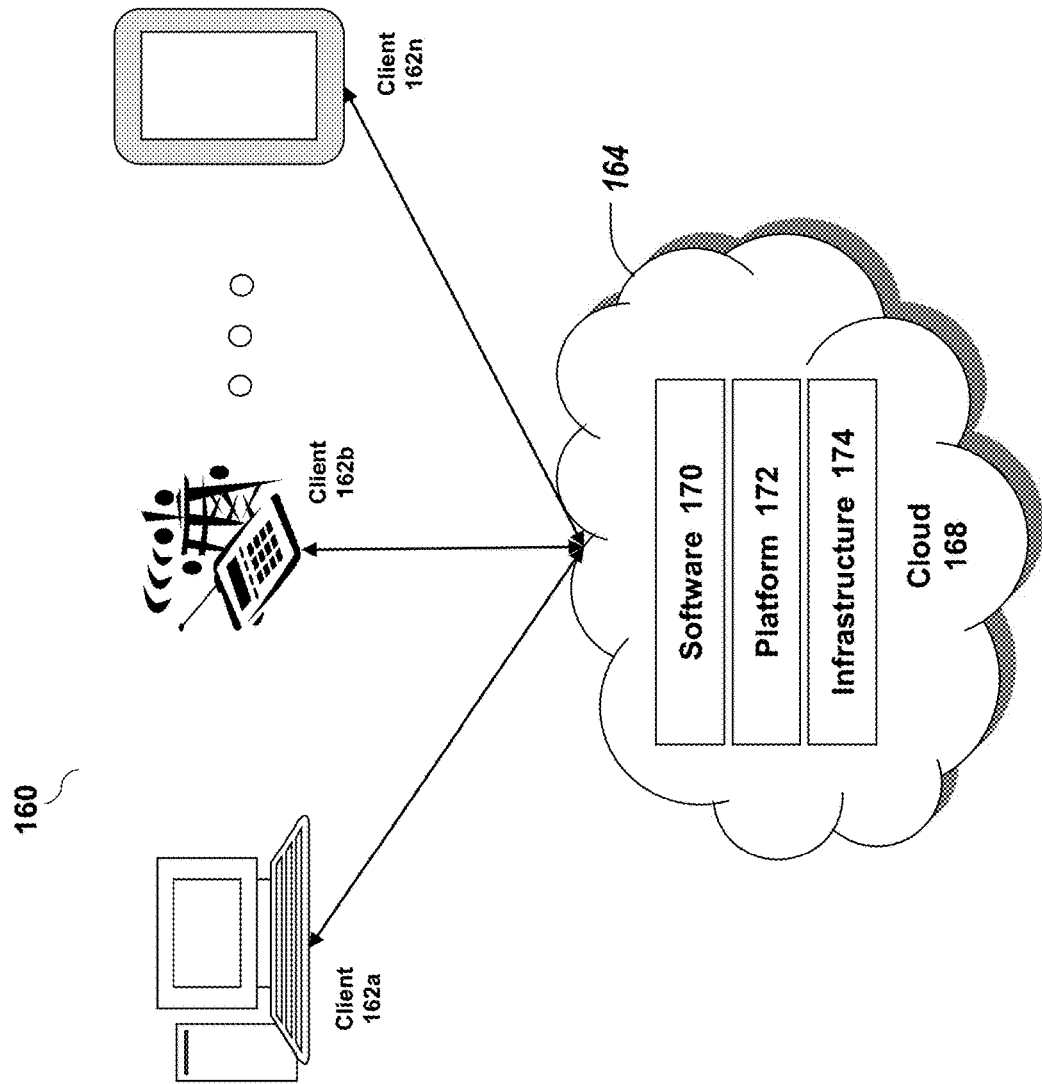
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 162 with one or more resources provided by a network environment. The computing environment 162 may include one or more clients 162a-162n, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g. Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Resource Appropriation in a Multi-Tenant Environment using Risk Scores and Value Scores The systems and methods described herein provide resource appropriation in a multi-tenant environment using risk scores and value scores. In embodiments, the multi-tenant environment can include a plurality of customer routing policies (e.g., applications) that share tenancy across a plurality of servers. (i.e., "applications") share tenancy across a multitude of servers. There can be multiple instances of applications active per customer (e.g., client, client device) at any particular point in time and applications on behalf of a plurality of customers also simultaneously active. As new customers are acquired or otherwise join the multi-tenancy environment and new application policies are defined, scheduling and resource management within the multi-tenancy environment can be modified. For example, in conventional scheduling and resource management approaches, assumptions can be made to generate the application policies. However, the systems and methods described herein can monitor specific applications and demands placed on the particular applications during execution of different requests to generate a risk model and value model for the applications. The risk models and value models can model one or more applications behavior over time, typical clients request services, consistency with access patterns to other customers and applications, and/or resource utilization patterns in fulfilling requests. In embodiments, the risk model and value model can provide or correspond to a dynamic input to a resource scheduling algorithm that determines parameters in which subsequent requests can be addressed.

Described herein, a resource server can execute within the multi-tenant environment to provide a plurality of applications access to a plurality of resources in response to requests from clients of the multi-tenant environment based in part on risk scores and value scores. The resource server can provide an initial amount of resource tokens to each of the applications. The resource tokens can be mapped to one or more resources (e.g., CPU execution time, memory consumption, performance data requested) available to the applications through the multi-tenant environment. In some embodiments, the resource tokens can correspond to access privileges given to a particular application to access one or more applications.

As an application begins executing or fulfilling requests received from clients, the resource server can monitor and collect metrics on behavior characteristics for request patterns correspond to received requests and execution behavior characteristics of the respective application executing the different requests. For example, the resource server can determine requests characteristics for requests received within the multi-tenant system and execution characteristics corresponding to the applications executing requests within the multi-tenant system. In some embodiments, the metrics can be determined or accumulated in real-time or substantially real-time from running services. In some embodiments, the metrics can be determined or accumulated based on a predetermined time period or using larger sets of data.

The resource server can use the determined metrics and client properties to generate a risk model and a value model for the applications of the multi-tenant system. For example, the resource server can generate a risk model based in part on a request log, execution metrics, and a history profile for the application. The resource server can generate a value model based in part on a value of a particular application or one or more clients. The risk model and value model can be executed to determine risk scores and value scores for each of the application. The resource server can use the risk scores and value scores to modify the number of resource tokens allocated to one or more of the applications. Thus, the resource server can provide a token-based resource allocation approach where the number of tokens allocated or associated with any particular application can be adjusted as a function of a change to a risk score, a change to a value score or to a change to both a risk score and a value score. In some embodiments, the number of tokens allocated or associated with any particular application can be increased as a function of an increase in a value score and/or a decrease in a risk score. In some embodiments, the number of tokens allocated or associated with any particular application can be decreased as a function of a decrease in a value score and/or an increase in a risk score. The resources allocated to the different applications through the use of resource tokens can be managed against resource threshold levels (e.g., starvation rails) for the multi-tenant environment such that the pool of resources do no exhaust and resources are appropriately available for the different applications. For example, the resource server can compare the risk scores and value scores to risk thresholds and value thresholds, respectively and make determinations of how to allocate the available resources responsive to the comparisons.

Figure 2:
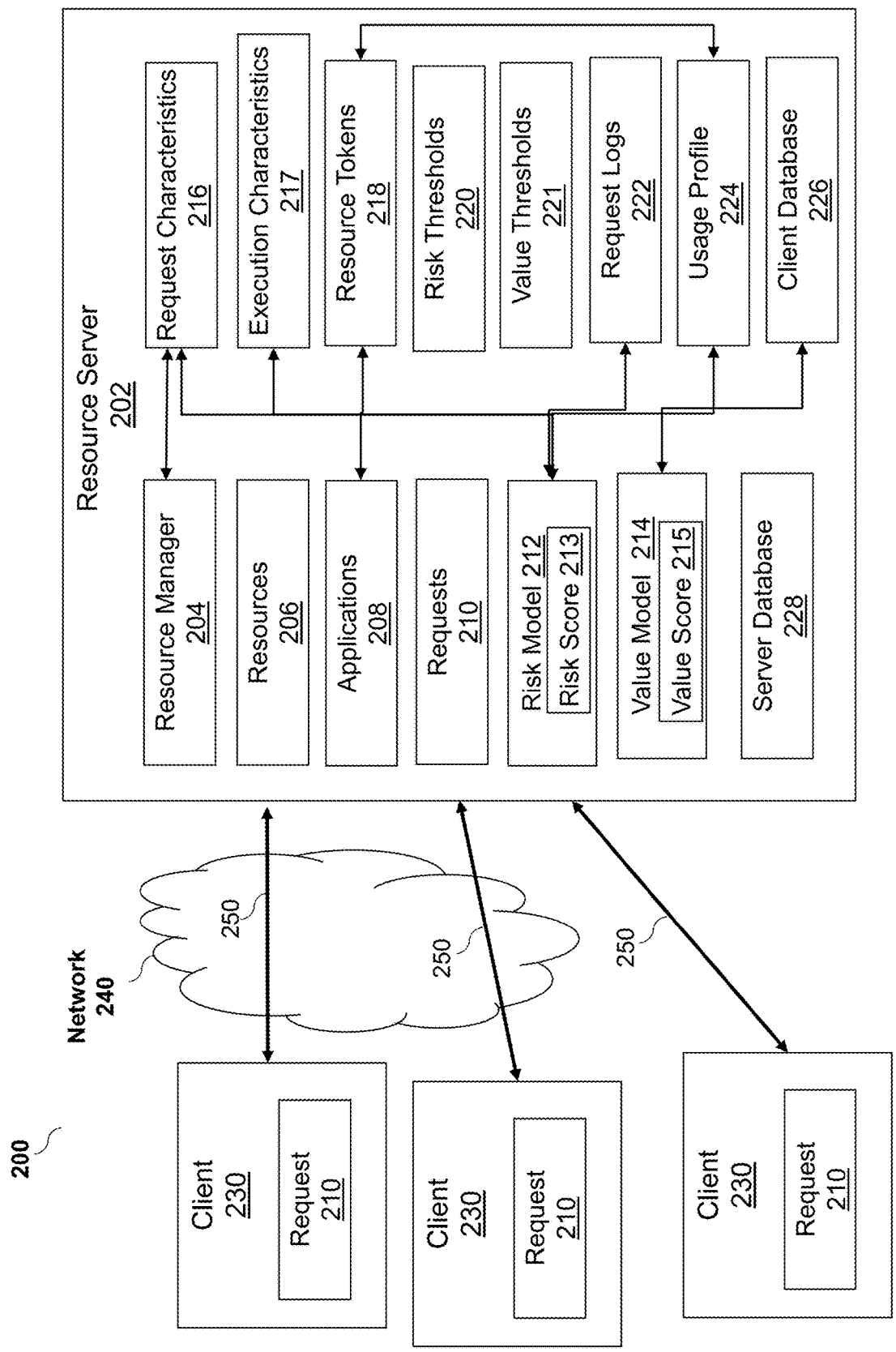
FIG. 2 is a block diagram of a system for resource appropriation in a multi-tenant environment using risk scores and value scores.

Referring to FIG. 2, depicted is a block diagram of one embodiment of a multi-tenant environment 200 having a resource server 202 to allocate resources 206 for a plurality of applications 208 executing within the multi-tenant environment 200. The multi-tenant environment 200 can be the same as or substantially similar to computing environment 160 of FIG. 1B. For example, the multi-tenant environment 200 can include a plurality of clients 230 (e.g., customers) interacting with or otherwise accessing different devices and/or endpoints within the multi-tenant environment 200. The clients 230 can generate requests 210 that are executed or handled by one or more applications 208 (e.g., routing applications, routing policies). The applications 208 can use one or more resources 206 to execute the different requests 210. The resource server 202 can assign or allocate resource tokens 218 to the applications 208 to control what resources 206 the respective applications 208 can access. The resource server 202 can generate risk scores 213 and value scores 215 for the applications 208 using a risk model 212 and value model 214, respectively, to make a determination on the number of resource tokens 218 allocated to an application 208.

The resource server 202 (e.g., server 202) can include a processor. The processor can include non-volatile memory that stores computer instructions and an operating system. For example, the computer instructions can be executed by the processor out of volatile memory to perform all or part of the method 300. The resource server 202 can include a resource manager 204. The resource manager 204 can include one or more processors to execute or perform all or part of the method 300. The resource manager 204 can include or execute policies or rules for the multi-tenant environment 200. The resource manager 204 can include a database and be configured to generate and/or store authentication credentials for one or more clients 230. In some embodiments, the resource manager 204 can receive the authentication credentials from the authentication server or from a client 230 and store the authentication credentials in a client database 226 responsive to receiving them. The resource manager 204 can be configured to provide enforcement support for sessions 250 between the resource server 202 and a client 230. The resource manager 204 can be configured to generate and apply access policies to control access to one or more resources 206. The resource manager 204 can be configured to generate access policies to generate one or more resource tokens 218 for access to one or more resources 206. The access policies and resource tokens 218 can indicate if access is allowed or prevented to a resource 206. The access policies and resource tokens 218 can indicate a level of access to a resource 206. For example, the resource manager 204 can determine a level of access to a resource 206 responsive to a risk score 213 or value score 215 corresponding to an application 208. The resource server 202 can generate one or more resource tokens 218 for one or more resources 206. In some embodiments, at least one resource token 218 can be generated for each resource 206. In embodiments, multiple resource tokens 218 can be generated for a resource 206. The resource tokens 218 can mapped to at least one resource 206.

The resources 206 can include policies or set of instructions for balancing load, bandwidth data, usage data and/or traffic routing data within the multi-tenant environment 200. The resources 206 can include, but not limited to, central processing unit (CPU) execution times, CPU duration times (e.g., maximum CPU durations, minimum CPU durations), memory allocated, memory usage (e.g., maximum memory consumption, minimum memory consumption), and/or performance data. The applications 208 can include routing applications and/or load balancing applications executing within the multi-tenant environment 200. For example, the applications 208 can include applications for, but not limited to, static routing, failover scenarios, round robin techniques, optimal round trip time techniques, and/or throughput techniques.

The resource server 202 can store one or more requests 210 in a request log 222. The requests 210 can be generated by one or more clients 230. The requests 210 can include client data indicating the client 230 generating the request 210, an application 208, an application identifier, a type of application, and/or a routing policy to handle the respective request 210. In some embodiments, the clients 230 can generate requests 210 to interact with or access different end points or providers within the multi-tenant environment 200. For example, the clients 230 (e.g., customers) can request 210 to access, including but not limited to, servers, devices, data centers, providers, and/or cloud services.

The request log 222 can include a database to store a plurality of requests 210. The request log 222 can be implemented using hardware or a combination of software and hardware. For example, each component of the request log 222 can include logical circuity (e.g., a central processing unit or CPU) that responses to and processes instructions fetched from a memory unit (e.g., database). Each component of the request log 222 can include or use a microprocessor or a multi-core processor. A multi-core processor can include two or more processing units on a single computing component. Each component of the request log 222 can be based on any of these processors, or any other processor capable of operating as described herein. Each processor can utilize instruction level parallelism, thread level parallelism, different levels of cache, etc. For example, the request log 222 can include at least one logic device such as a computing device or server having at least one processor to communicate via a network 240. The components and elements of the request log 222 can be separate components or a single component. For example, the request log 222 can include combinations of hardware and software, such as one or more processors configured to initiate stop commands, initiate motion commands, and transmit or receive timing data, for example.

The resource server 202 can generate a risk model 212. The risk model 212 can include an algorithm configured to receive a set of inputs and generate a risk score 213 for an application 208. For example, the risk model 212 can one or more processors and include a set of instructions that when executed, the set of instructions cause the risk model 212 to generate a risk score 213 indicating a risk level of a respective application 208. The risk model 212 can determine a risk score based in part on a behavior pattern of the application while executing one or more request 210 and utilization of one or more resources 206 while executing one or more requests 210. The resource server 202 can dynamically execute the risk model 212 to generate risk scores 213 for an application 208 as the application 208 executes new requests 210.

The resource server 202 can generate a value model 214. The value model 214 can include an algorithm configured to receive a set of inputs and generate a value score 215 for an application 208. For example, the value model 214 can one or more processors and include a set of instructions that when executed, the set of instructions cause the value model 214 to generate a value score 215 indicating a value level of a respective application 208. In some embodiments, the value score 215 can correspond to a valuation of the respective application 208 by a client 230, group of clients 230 or types of clients 230 interacting with the respective application 208. The resource server 202 can dynamically execute the value model 214 to generate value scores 215 for an application 208 as the application 208 executes new requests 210.

The resource server 202 can include a history profile 224 (e.g., usage history profile). The history profile 224 can include a database to store history profiles for clients 230, history profiles for resources 206, history profiles for applications 208, and history profiles for requests 210. The history profile 224 can be implemented using hardware or a combination of software and hardware. For example, each component of the history profile 224 can include logical circuity (e.g., a central processing unit or CPU) that responses to and processes instructions fetched from a memory unit. Each component of the history profile 224 can include or use a microprocessor or a multi-core processor. A multi-core processor can include two or more processing units on a single computing component. Each component of the history profile 224 can be based on any of these processors, or any other processor capable of operating as described herein. Each processor can utilize instruction level parallelism, thread level parallelism, different levels of cache, etc. For example, the history profile 224 can include at least one logic device such as a computing device or server having at least one processor to communicate via a network 260. The components and elements of the history profile 224 can be separate components or a single component. For example, the history profile 224 can include combinations of hardware and software, such as one or more processors configured to initiate stop commands, initiate motion commands, and transmit or receive timing data, for example. The history profile 224 can include a structured set of data stored for the resource server 202. For example, the history profile 224 can include a plurality of historical profiles for clients 230, resources 206, applications 208, and requests 210. The files can be generated by the resource server 202 and stored in the history profile 224. The history profile 224 can include a memory component to store and retrieve data. The memory can include a random access memory (RAM) or other dynamic storage device, coupled with the history profile 224 for storing information, and instructions to be executed by the resource server 202. The memory can include at least one read only memory (ROM) or other static storage device coupled with the history profile 224 for storing static information and instructions for the resource server 202. The memory can include a storage device, such as a solid state device, magnetic disk or optical disk, coupled with the history profile 224 to persistently store information and instructions.

The resource server 202 can include or generate one or more risk thresholds 220 and one or more value thresholds 221. The risk threshold 220 can indicate a risk threshold level a risk assessment of an application 208 needs to be less than or under for the application 208 to be allocated a respective resource token 218 corresponding to the resource 206. For example, the risk threshold 220 can correspond to a threshold that a risk score 213 for an application 208 needs to be less than for the respective application 208 to be given access to a particular resource 206. The resource server 202 can generate a risk threshold 220 for each resource 206. The value threshold 221 can indicate a value threshold level a value assessment of an application 208 needs to be greater than or over for the application 208 to be allocated a respective resource token 218 corresponding to the resource 206. For example, the value threshold 221 can correspond to a threshold that a value score 215 for an application 208 needs to be greater than for the respective application 208 to be given access to a particular resource 206. The resource server 202 can generate a value threshold 221 for each resource 206.

The resource server 202 can determine or accumulate metrics, such as but not limited to, request characteristics 216 (e.g., request metrics) and execution characteristics 217 (e.g., execution metrics). The request characteristics 216 can include a processing duration value and a memory utilization profile for an application 208 corresponding to the requests 210 executed by the application 208. The processing duration value can include CPU processing times and/or CPU duration times corresponding a time value used to execute of fulfill a request 210. For example, the request characteristics 216 can include CPU duration used, maximum CPU duration used, minimum CPU duration used, memory allocation or consumption, maximum memory consumption, minimum memory consumption, bandwidth allocation, and/or performance data. The request characteristics 216 can include client properties (e.g., IP address, device type) corresponding to the clients 230 generating the requests 210. The execution characteristics 217 can include metrics corresponding to the execution of a particular request 210, properties of the application 208 handling the request 210, and/or properties of the clients 230 generating the request 210. For example, the execution characteristics 217 can include fail-over behavior for one or more clients 230. The execution characteristics 217 can include metrics corresponding to normal "in-flight" requests 210 (e.g., typical requests 210) and peak simultaneous "in-flight" requests 210 for an application 208 on one or more different servers. In some embodiments, the execution characteristics 217 can include metrics corresponding to a consistency value of one or more clients 230 making requests 210 using valid DNS redirect techniques that indicate a valid originating IP address accepting and processing DNS responses.

The resource server 202 can include a client database 226 (e.g., customer database). The client database 226 can include a database to store client data and client properties. The client database 226 can include client properties, such as but not limited to, an IP address, device type, properties of the client 230 generating the request 210, properties of typical clients 230 generating similar requests 210 for the same application 208, and/or properties of typical client 230 generating similar requests 210 for the same server or group of servers. The client database 226 can be implemented using hardware or a combination of software and hardware. For example, each component of the client database 226 can include logical circuity (e.g., a central processing unit or CPU) that responses to and processes instructions fetched from a memory unit. Each component of the client database 226 can include or use a microprocessor or a multi-core processor. A multi-core processor can include two or more processing units on a single computing component. Each component of the client database 226 can be based on any of these processors, or any other processor capable of operating as described herein. Each processor can utilize instruction level parallelism, thread level parallelism, different levels of cache, etc. For example, the client database 226 can include at least one logic device such as a computing device or server having at least one processor to communicate via a network 260. The components and elements of the client database 226 can be separate components, a single component, or a part of resource server 202. For example, the client database 226 can include combinations of hardware and software, such as one or more processors configured to initiate stop commands, initiate motion commands, and transmit or receive timing data, for example. The client database 226 can include a structured set of data stored for the resource server 202. For example, the client database 226 can include properties and data corresponding to one or more clients 230 interacting with different applications 208 of the multi-tenant environment 200. The client properties and data can be collected by the resource server 202 and stored in the client database 226. The client database 226 can include a memory component to store and retrieve data. The memory can include a random access memory (RAM) or other dynamic storage device, coupled with the client database 226 for storing information, and instructions to be executed by the resource server 202. The memory can include at least one read only memory (ROM) or other static storage device coupled with the client database 226 for storing static information and instructions for the resource server 202. The memory can include a storage device, such as a solid state device, magnetic disk or optical disk, coupled with the client database 226 to persistently store information and instructions.

The resource server 202 can include a server database 228. For example, the resource server 202 can store different resources 206 available within the multi-tenant environment 200 or provided by the resource server 202 in the server database 228. The server database 228 can be implemented using hardware or a combination of software and hardware. For example, each component of the server database 228 can include logical circuity (e.g., a central processing unit or CPU) that responses to and processes instructions fetched from a memory unit. Each component of the server database 228 can include or use a microprocessor or a multi-core processor. A multi-core processor can include two or more processing units on a single computing component. Each component of the server database 228 can be based on any of these processors, or any other processor capable of operating as described herein. Each processor can utilize instruction level parallelism, thread level parallelism, different levels of cache, etc. For example, the server database 228 can include at least one logic device such as a computing device or server having at least one processor to communicate via a network 260. The components and elements of the server database 228 can be separate components, a single component, or a part of resource server 202. For example, the server database 228 can include combinations of hardware and software, such as one or more processors configured to initiate stop commands, initiate motion commands, and transmit or receive timing data, for example. The server database 228 can include a structured set of data stored for the resource server 202. For example, the server database 228 can include properties and data corresponding to resources 206, applications 208 and/or requests 210 interacting within the multi-tenant environment 200. The server database 228 can include a memory component to store and retrieve data. The memory can include a random access memory (RAM) or other dynamic storage device, coupled with the server database 228 for storing information, and instructions to be executed by the resource server 202. The memory can include at least one read only memory (ROM) or other static storage device coupled with the server database 228 for storing static information and instructions for the resource server 202. The memory can include a storage device, such as a solid state device, magnetic disk or optical disk, coupled with the server database 228 to persistently store information and instructions.

The clients 230 can include a client device, such as, but not limited to a computing device or a mobile device. The clients 230 can couple with the resource server 202 through network 240. The clients 230 can include or correspond to an instance of any client device, mobile device or computer device described herein. For example, the clients 230 can be the same as or substantially similar to computer 101 of FIG. 1A and clients 162 of FIG. 1B. At least one client 230 can generate a request 210 to interact with or access a device, server or endpoint of the multi-tenant environment 200 using one or more applications 208 and one or more resources 206. The clients 230 can establish one or more sessions 250 to the resource server 202. The sessions 250 may include, but not limited to, an application session, an execution session, a desktop session, a hosted desktop session, a terminal services session, a browser session, a remote desktop session, a URL session and a remote application session. The sessions 250 may include encrypted and/or secure sessions established between a client 230 and the resource server 202. For example, the session 250 may include an encrypted session and/or a secure session established between a client 230 and a resource server 202. The encrypted session 250 can include an encrypted file, encrypted data or traffic transmitted between a client 230 and the resource server 202.

Network 240 may be a public network, such as a wide area network (WAN) or the Internet. Network 240 may be the same as or substantially similar to network 164 of FIG. 1B. In some embodiments, network 240 may be a private network such as a local area network (LAN) or a company Intranet. Network 240 may be a public network, such as a wide area network (WAN) or the Internet. Network 240 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, clients 230 and resource server 202 may be on the same network 240. In some embodiments, clients 230 and resource server 202 may be different networks 240. The network 240 can include a virtual private network (VPN). The VPN can include one or more encrypted sessions 250 from the client 230 to the resource server 202 over network 240 (e.g., internet, corporate network, private network).

Each of the above-mentioned elements or entities is implemented in hardware, or a combination of hardware and software, in one or more embodiments. Each component of the resource server 202 may be implemented using hardware or a combination of hardware or software detailed above in connection with FIG. 1A and FIG. 1B. For instance, each of these elements or entities can include any application, program, library, script, task, service, process or any type and form of executable instructions executing on hardware of a client device (e.g., the client 230). The hardware includes circuitry such as one or more processors in one or more embodiments.

Figure 3B:
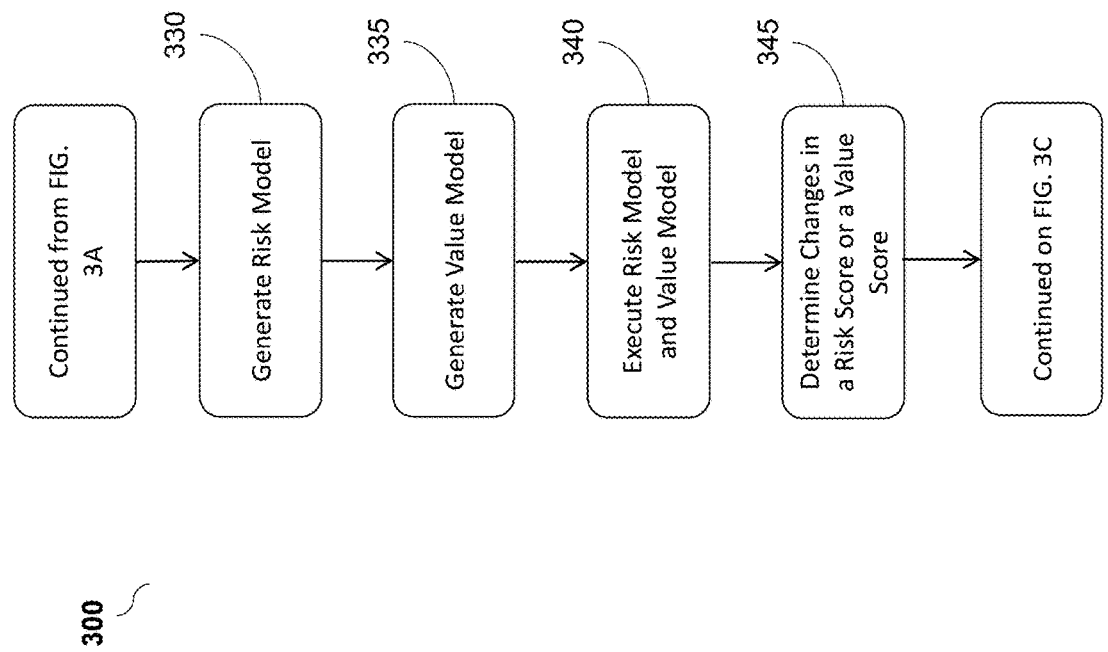
Figure 3C:
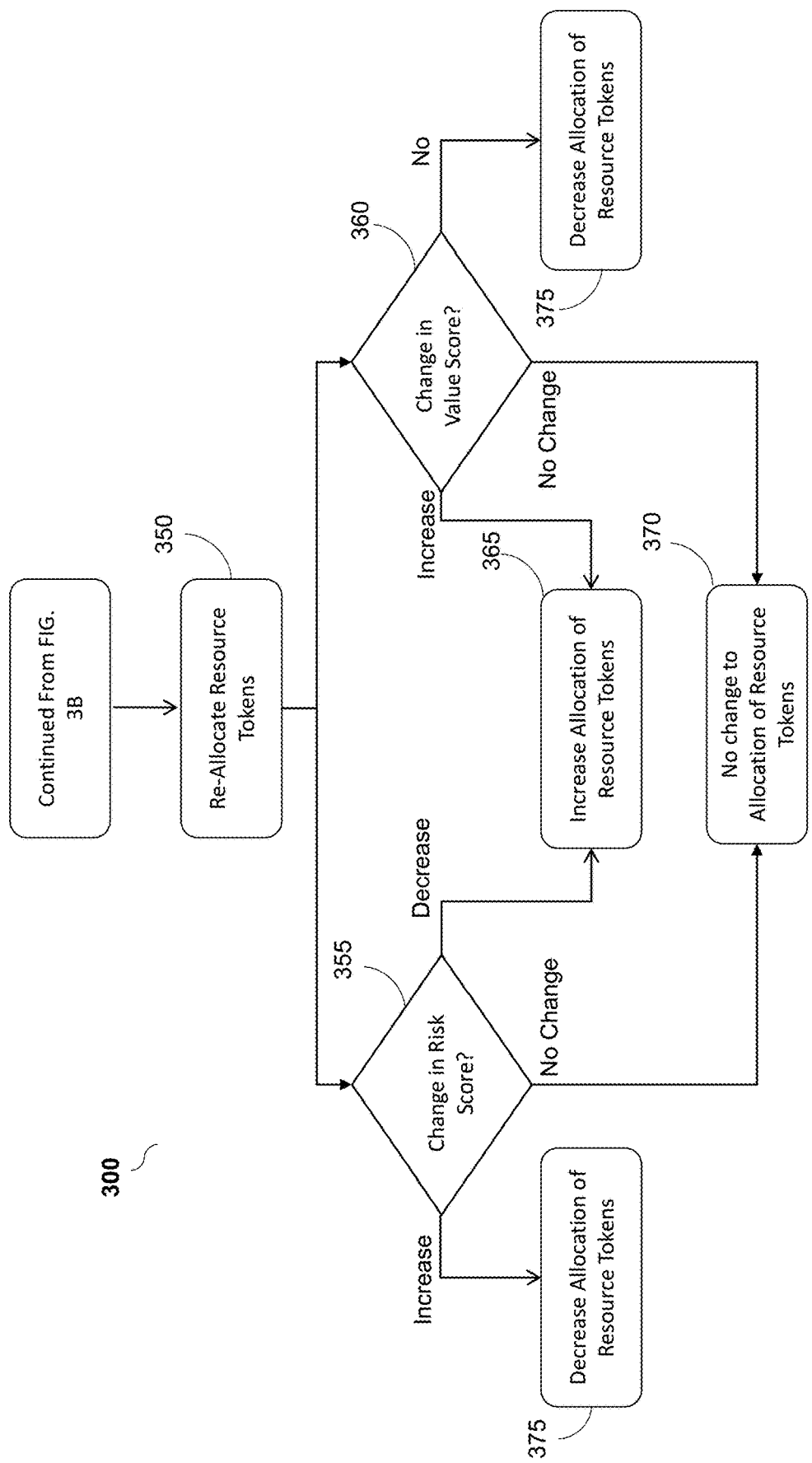

Referring now to FIGS. 3A-3C, depicted is a flow diagram of one embodiment of a method 300 for a method for resource appropriation in a multi-tenant environment using risk scores and value scores. The functionalities of the method 300 may be implemented using, or performed by, the components detailed herein in connection with FIGS. 1-2. In brief overview, a plurality of resources can be identified (305). Resource tokens can be allocated to a plurality of applications (310). Requests can be received from one or more clients (315). Execution of the requests can be monitored (320). Metrics can be determined for the applications (325). A risk model can be generated (330). A value model can be generated (335). The risk model and the value model can be executed (340). Changes in a risk score or a value score can be determined (345). Resource tokens can be re-allocated (350).

A determination can be made whether the risk score changed (355). Responsive to a decrease in the risk score, the allocation of resource tokens can be increased (365). Responsive to no change in the risk score, the allocation of resource tokens can be maintained at a current level (370). Responsive to an increase in the risk score, the allocation of resource tokens can be decreased (375). A determination can be made whether the value score changed (360). Responsive to an increase in the value risk score, the allocation of resource tokens can be increased (365). Responsive to no change in the value score, the allocation of resource tokens can be maintained at a current level (370). Responsive to a decrease in the value score, the allocation of resource tokens can be decreased (375).

Referring now to operation (305), and in some embodiments, a plurality of resources 206 can be identified. A resource server 202 can be disposed within a multi-tenant environment 200 to manage and balance resource allocation for a plurality of applications 208. The applications 208 can correspond to load balancing applications, routing applications or routing policies that share tenancy across a plurality of servers within the multi-tenant environment 200. The resource server 202 can identify a plurality of resources 206 of the multi-tenant environment 200. The resources 206 can correspond to load balancing data, bandwidth data, usage data and/or traffic routing data. For example, the resources 206 can include, but not limited to, central processing unit (CPU) execution times, CPU duration times (e.g., maximum CPU durations, minimum CPU durations), memory allocated, memory usage (e.g., maximum memory consumption, minimum memory consumption), and/or performance data. The resource server 202 can use properties of the multi-tenant environment 200 stored in a server database 228. In some embodiments, the different resources 206 available within the multi-tenant environment 200 or provided by the resource server 202 can be stored in the server database 228.

Referring now to operation (310), and in some embodiments, resource tokens 218 can be allocated to a plurality of applications 208. For example, the resource server 202 can assign a first allocation of resource tokens 218 to an application 208 of a plurality of applications 208 in the multi-tenant environment 200. The resource tokens 218 can correspond to access privileges to a plurality of resources 206 for the application 208. The multi-tenant environment 200 can include a plurality of clients 230 generating requests 210 for the plurality of applications 208.

The resource server 202 can allocate or assign an initial number of resource tokens 218 to each of the applications 208 available or executing within the multi-tenant environment 200. The resource tokens 218 can identify whether a particular application 208 has access to a particular resource 206 and/or a level of access to an application 208. For example, the resource server 202 can map or link each of the resource tokens 218 with at least one resource 206 of the plurality of resources 206. In some embodiments, the applications 208 can be allocated resource tokens 218 for each of the resources 206 the respective application 208 has permission to access. The number of resource tokens 218 allocated to an application 208 can correspond to the number of resources 206 the respective application 208 can access to use to process, fulfill or execute requests 210 received from one or more clients 230.

In some embodiments, to determine an initial amount of resource tokens 218 to allocate to an application 208, the resource server 202 can use previous data from a usage history profile 224 corresponding to the application 208 and/or a data from a request log 222 corresponding to the application 208. For example, the resource server 202 can identify past resources 206 an application 208 has interacted with and/or a level of interaction with the resources 206. In some embodiments, to determine an initial amount of resource tokens 218 to allocate to an application 208, the resource server 202 can use resource threshold levels. For example, the resource server 202 can allocate a minimum level of access to each of the resources 206 to each of the applications 208. Thus, in some embodiments, the resource server 202 can allocate the same number of resource tokens 218 to each of the applications 208.

Referring now to operation (315), and in some embodiments, requests 210 can be received from one or more clients 230. The clients 230 can generate requests 210 to interact with or access different end points or providers within the multi-tenant environment 200. For example, the clients 230 (e.g., customers) can request 210 to access, including but not limited to, servers, devices, data centers, providers, and/or cloud services. The requests 210 can include an application 208, an application identifier, a type of application, and/or a routing policy to handle the respective request 210. The resource server 202 can correspond to a load balancing and traffic management server and allocate resources 206 for the plurality of applications 208 to handle and execute the respective requests 210. In some embodiments, the resource server 202 can use the resource tokens 218 to determine a best path for traffic corresponding to a particular request 210. For example, the resource server 202 can identify an application 208 to execute a request 210 based in part on the resource tokens 218 allocated to the respective application 208.

Referring now to operation (320), and in some embodiments, execution of the requests 210 can be monitored. For example, the resource server 202 can monitor requests 210 executed by an application 208 of the plurality of applications 208 using the resource tokens 218 and the resource server 202 can monitor the plurality of resources 206 corresponding to the resource tokens 218. The resource server 202 can monitor requests 210 received from one or more of the clients 230 and identify application attributes (e.g., application type, application identifier) included within the respective request 210. In some embodiments, the resource server 202 can determine which application 208 will handle and execute a received request 210. The request 210 can be generated by at least one client 230. The resource server 202 can identify the application 208 using the application attributes included within the request 210 and the resource tokens 218 allocated to the different applications 208. For example, the resource server 202 can identify which applications 208 have been allocation resource tokens 218 corresponding to the resource attributes included in the request 210 and select at least one application 208 to execute the request 210. In some embodiments, the requests 210 can be transmitted to or received by an application 208. For example, the application 208 can received the request 210 from the client 230 generating the request and execute the request 210. The resource server 202 can continuously monitor each of the requests 210 as they are handled and executed within the multi-tenant environment 200.

Referring now to operation (325), and in some embodiments, metrics can be determined for the applications 208. For example, the resource server 202 can accumulate or determine metrics corresponding to the requests 210 executed by an application 208 or a plurality of applications 208. The resource server 202 can continually monitor and determine metrics as requests 210 are executed by applications 208 within the multi-tenant environment 200. The metrics can include request characteristics 216 of the requests 210 and the execution characteristics 217 corresponding to the application 208.

In some embodiments, the resource server 202 can determine a processing duration value and a memory utilization profile for an application 208 corresponding to the requests 210 executed by the application 208. The processing duration value can include CPU processing times and/or CPU duration times corresponding a time value used to execute of fulfill a request 210. For example, the request characteristics 216 can include CPU duration used, maximum CPU duration used, minimum CPU duration used, memory allocation or consumption, maximum memory consumption, minimum memory consumption, bandwidth allocation, and/or performance data. In some embodiments, the request characteristics 216 can include client properties (e.g., IP address, device type) corresponding to the clients 230 generating the requests 210. For example, the request characteristics can include, but not limited to, properties of the client 230 generating the request 210, properties of typical clients 230 generating similar requests 210 for the same application 208, and/or properties of typical client 230 generating similar requests 210 for the same server or group of servers.

In some embodiments, the resource server 202 can generate a request history profile 224 (e.g., usage for an application 208. The request history profile 224 can include data corresponding to each request 210 executed by the respective application 208. The request history profile 224 can include the request characteristics 216 and the execution characteristics 217 collected and determined by the resource server 202 for the requests 210 executed by the respective application 208. The execution characteristics 217 can include metrics corresponding to the execution of a particular request 210, properties of the application 208 handling the request 210, and/or properties of the clients 230 generating the request 210. For example, in some embodiments, the resource server 202 can determine metrics corresponding to fail-over behavior for one or more clients 230. For example, the resource server 202 can access records corresponding to one or more clients 230, such as NS anycast IP records. The resource server 202 can group, compare or organize the request characteristics 216 based on the client properties to determine different metrics. For example, the resource server 202 can compare properties from one or more clients 230 making requests 210 across customer properties of clients 230 making the same type of or similar requests 210 (e.g., requests for same resources 206). In embodiments, the resource server 202 can determine individual application patterns for the applications 208 used to execute the respective request 210. The resource server 202 can determine metrics corresponding to normal "in-flight" requests 210 (e.g., typical requests 210) and peak simultaneous "in-flight" requests 210 for an application 208 on one or more different servers. In some embodiments, the resource server 202 can determine metrics corresponding to a consistency value of one or more clients 230 making requests 210 using valid DNS redirect techniques that indicate a valid originating IP address accepting and processing DNS responses.

The resource server 202 can determine or accumulate the metrics corresponding to the requests 210 executed by the applications 208 in real-time or substantially real-time. For example, the resource server 202 can monitor the requests 210 being executing within the multi-tenant environment 200 in real-time and determine the metrics as the requests 210 are being fulfilled or otherwise executed. The resource server 202 can determine or accumulate the metrics corresponding to the requests 210 executed by the applications 208 over a predetermined time period or based on a size of a dataset. For example, the resource server 202 can determine metrics and group the metrics based on different time periods, such as but not limited to, peak traffic periods, minimum traffic periods, typical or normal traffic periods. The resource server 202 can determine metrics and group the metrics based on different time periods, such as but not limited to, hourly statistics, daily statistics, weekly statistics, and/or monthly statistics.

In some embodiments, the resource server 202 can determine or accumulate the metrics (e.g., request characteristics, execution characteristics) corresponding to the requests 210 over a predetermined time period or multiple predetermined time periods. The time periods (e.g., sampling periods, monitoring periods) can vary and can be selected by the resource server 202 and/or an administrator of the resource server 202. The resource server 202 can monitor and collect the metrics for the define time period and group the metrics into one or more data sets corresponding to different time periods. For example, the resource server 202 can generate a data set for hourly statistics, a data set for daily statistics, a data set for weekly statistics, a data set for monthly statistics, a data set for peak traffic periods, a data set for minimum traffic periods, and/or a data set for typical and/or normal traffic periods. In some embodiments, the resource server 202 can average or aggregate the metrics for the particular predetermined time period into a data set or multiple data sets. The resource server 202 can provide or input the data set or multiple data sets into the risk model 212 to determine or identify a risk score 213 for the application 208 based on or over the particular time period. Thus, the risk model 212 can generate different and/or multiple risk scores 213 for an application 208 corresponding to different time periods (e.g., hourly statistics, daily statistics, weekly statistics, monthly statistics, peak traffic periods, minimum traffic periods, typical and/or normal traffic periods).

In some embodiments, the resource server 202 can generate a client application profile for an application 208 corresponding to a listing of clients 230 interacting with the application 208. For example, the client application profile can include each request 210 the respective application 208 handled or executed and the client 230 that generated the respective request 210. The client application profile can include properties of the clients 230 interacting with the respective application 208. The client application profile can include the resources 206 used by the application 208 to handle or execute different requests 210. The client application profile and be stored in a client database 226.

Referring now to operation (330), and in some embodiments, a risk model 212 can be generated. For example, the resource server 202 can generate a risk model 212 using the request characteristics 216 and the execution characteristics 217. The risk model 212 can generate a risk score 213 corresponding to a level of risk for at least one application 208. For example, the risk model 212 can generate the risk score 213 for the application 208 based on the request characteristics 216 and execution characteristics 217.

The risk model 212 can include or be provided a plurality of inputs to determine risk scores 213 for one or more applications 208 executing in the multi-tenant environment 200. The resource server 202 can generate or collect various inputs for the risk model 212 to model and determine risk scores 213 for the different applications 208. A risk score 213 can correspond to behavior of an application 208 when executing a request 210. A risk score 213 can indicate a risk level of a particular application 208 to the multi-tenant environment 200 in view of or compared against the other applications 208 executing within the multi-tenant environment 200. For example, the risk score 213 can indicate how the application 208 processed the request 210, one or more connections established during execution of a request 210, redirection techniques used by the application 208 during execution of a request 210, and/or responses received or generated by the application 208 during execution of a request 210.

In embodiments, the resource server 202 can determine and maintain a risk assessment for each of the applications 208 using the risk model 212 and risk scores 213. The resource server 202 can determine and maintain a risk assessment for each of the applications 208 on a per routing application basis and/or a per request basis. The resource server 202 can use and incorporate the historical information (e.g., history profiles 224, request logs 222) into the risk model 212 for a particular application 208 to generate a risk score that is based upon more than a current request 210 being executed by the application 208 or a most recent request executed by the application 208. In some embodiments, the inputs to the risk model 212 can include, but not limited to, request characteristics 216, execution characteristics 217, history profiles 224 for the applications 208 and/or requests 210, and request logs 222 corresponding to the requests 210.

In some embodiments, the resource server 202 can generate a resource token usage profile for each of the plurality of resource tokens 218. The resource token usage profile can include a listing identifying the applications 208 the respective resource token 218 has been allocated to. The resource token usage profile can include a listing of the resource 206 or resources 206 that the respective resource token 218 is mapped to. The resource token usage profile can include a risk threshold indicating a risk threshold level needed to be less than or under for an application 208 to be allocated the respective resource token 218. The resource token usage profile can include a value threshold indicating a value threshold level needed to be greater than or over for an application 208 to be allocated the respective resource token 218. The resource token usage profile can be stored in a request log database 222 of the resource server 202. The resource server 202 can provide the resource token usage profile for the resource tokens 218 as at least one input for the risk model 212.

Referring now to operation (335), and in some embodiments, a value model can be generated. For example, the resource server can generate a value model 214 using properties of the application 208 and properties of the one or more clients 230 of the plurality of clients 230 that generated the requests 210. The value model 214 can generate a value score 215 for the application 208 based on the properties of the application 208 and the properties of the one or more clients 230 of the plurality of clients 230.

The value model 214 can include or be provided a plurality of inputs to determine value scores 215 for one or more applications 208 executing in the multi-tenant environment 200. The resource server 202 can generate or collect various inputs for the value model 214 based in part on an importance or value of the respective application 208 to a client 230 or plurality of clients 230 (e.g., group of clients). The value score 215 can correspond to an important of a client 230 generating a request 210 for the application 208, multiple clients 230 generating requests for the application 208, an important of the application 208 based on the client 230 or group of clients 230 generating requests 210, and/or a use of the application 208 by a client 230 or group of clients 230. The inputs to the value model 214 can include, but not limited to, request characteristics 216, execution characteristics 217, history profiles 224 for the applications 208 and/or requests 210, request logs 222, application properties and/or client properties from a client database 226. In some embodiments, the resource server 202 can identify or extract the properties of the one or more clients 230 of the plurality of clients 230 from a client database 226. For example, the resource server 202 can identify, extract or retrieve properties including at least one of: an importance score for a respective client, an account type of the respective client, and a resiliency profile for the respective client. The resource server 202 can provide the identified or extracted properties from the client database 226 as inputs into the value model 214.

Referring now to operation (340), and in some embodiments, the risk model 212 and the value model 214 can be executed. For example, the resource server 202 can execute the risk model 212, the value model 214 or both the risk model 212 and the value model 214 to determine a second allocation of the resource tokens 218 for the application 208 using the risk model 212 and the value model 214. The resource server 202 can execute or run the risk model 212 to generate at least one risk score 213 for an application 208. In some embodiments, the resource server 202 can dynamically execute or run the risk model 212 to generate at least one risk score 213 for an application 208 as the respective application 208 receives a request 210, executes a request 210, or upon completing a request 210. For example, the resource server 202 can provide one or more inputs to the risk model 212 to generate a risk score 213. The risk model 212 can correspond to an algorithm having a set of instructions to take the set of inputs and generate the risk score 213. The risk model 212 can take the inputs, such as but not limited to, the request characteristics 216 and execution characteristics 217 to characterize a risk associated with the corresponding application 208 and generate the risk score 213. In some embodiments, the resource server 202 can assign weights to the different inputs to the risk model 212. For example, each of the inputs can be ranked or ordered using weight values. The weights can be selected based in part on the application 208 to be profiled using the risk model 212. The weights can be selected based in part on a type of application or group of applications 208 to be profiled using the risk model 212. In some embodiments, the weights selected can be the same for each iteration of the risk model 212.

The resource server 202 can execute a set of instructions corresponding to the risk model 212. In some embodiments, the resource server 202 can provide the inputs sequentially to the risk model 212 or at the same time (e.g., simultaneously). The risk model 212 can combine each of the inputs and their respective weight values to determine an overall risk score 213 for the application 208. In some embodiments, the risk score 213 can correspond to a total weighted risk value for the respective application 208. The resource server 202 can continuously execute the risk model 212 to dynamically update, modify and/or maintain a risk score 213 (e.g., risk assessment) for an application 208. In some embodiments, the resource server 202 can execute the risk model 212 when an application 208 receives a request 210, is actively executing the request 210, or has executed the request 210. In some embodiments, the resource server 202 can dynamically update a risk score 213 for an application 208 by executing the risk model 212 when an application 208 receives a request 210, is actively executing the request 210, or has executed the request 210.

The resource server 202 can execute or run the value model 214 to generate at least one value score 215 for an application 208. In some embodiments, the resource server 202 can dynamically execute or run the value model 214 to generate at least one value score 215 for an application 208 as the respective application 208 receives a request 210, executes a request 210, or upon completing a request 210. For example, the resource server 202 can provide one or more inputs to the value model 214 to generate a value score 215. The value model 214 can correspond to an algorithm having a set of instructions to take the set of inputs and generate the value score 215. The value model 214 can take the inputs, such as but not limited to, the application properties and client properties to characterize a value associated with the corresponding application 208 and generate the value score 215. In some embodiments, the resource server 202 can assign weights to the different inputs to the value model 214. For example, each of the inputs can be ranked or ordered using weight values. The weights can be selected based in part on the application 208 to be profiled using the value model 214. The weights can be selected based in part on a type of application or group of applications 208 to be profiled using the value model 214. In some embodiments, the weights selected can be the same for each iteration of the value model 214.

The resource server 202 can execute a set of instructions corresponding to the value model 214. In some embodiments, the resource server 202 can provide the inputs sequentially to the value model 214 or at the same time (e.g., simultaneously). The value model 214 can combine each of the inputs and their respective weight values to determine an overall value score 215 for the application 208. In some embodiments, the value score 215 can correspond to a total weighted value for the respective application 208. The resource server 202 can continuously execute the value model 214 to dynamically update, modify and/or maintain a value score 215 (e.g., value assessment) for an application 208. In some embodiments, the resource server 202 can execute the value model 214 when an application 208 receives a request 210, is actively executing the request 210, or has executed the request 210. In some embodiments, the resource server 202 can dynamically update a value score 215 for an application 208 by executing the value model 214 when an application 208 receives a request 210, is actively executing the request 210, or has executed the request 210.

The resource server 202 can determine whether the current allocation of resource tokens 218 for an application 208 is appropriate responsive to executing the risk model 212, executing the value model 214, or executing both the risk model 212 and the value model 214. For example, the resource server 202 can determine a second allocation of resource tokens 218 for an application 208 is appropriate responsive to executing the risk model 212, executing the value model 214, or executing both the risk model 212 and the value model 214. In some embodiments, the second allocation of resource tokens 218 can be greater than the first allocation of resource tokens 218. The second allocation of resource tokens 218 can be less than the first allocation of resource tokens 218. The second allocation of resource tokens 218 can be equal to or the same as the first allocation of resource tokens 218. In embodiments, a difference between the first allocation of resource tokens 218 and the second allocation of resource tokens 218 can correspond to a difference between the risk score 213 generated by the risk model 212 and the value score 215 generated by the value model 214.

Referring now to operation (345), and in some embodiments, changes in a risk score 213 or a value score 215 can be determined. For example, the resource server 202 can determine, responsive to executing the risk model 212, executing the value model 214, or executing both the risk model 212 and the value model 214, that a previous risk score 213 and/or value score 215 changed for an application 208. Referring now to operation (350), and in some embodiments, resource tokens 218 can be re-allocated (350). The resource tokens 218 can be re-allocated responsive to a change in a risk score 213, a change in a value score 215, or changes to both a risk score 213 and a value score 215. For example, and referring now to operation (355), and in some embodiments, a determination can be made whether the risk score 213 changed. For example, the resource server 202 can make a determination whether the risk score 213 for an application 208 increased from a previous risk score 213, decreased from a previous risk score 213 or stayed the same as a previous risk score 213. The resource server 202 can compare the most recent risk score 213 to a previous or last risk score 213 to make the determination.

Referring now to operation (365), and in some embodiments, responsive to a decrease in the risk score 213, the allocation of resource tokens can be increased. The resource server 202 can determine that the risk score 213 for an application has decreased thus indicating that a risk level of the respective application 208 has decreased. The resource server 202 can provide the respective application 208 access to more resources 206 of the multi-tenant environment 200. For example, the resource server 202 can identify new resources 206 that the application 208 does not have access and generate resource tokens 218 mapped to the new resources 206 that the application 208 does not have access to. The resource server 202 can allocate the new resource tokens 218 mapped to the one or more additional resources 206 to the respective application 208 responsive to the decrease in the risk score 213 for the respective application 208.

In some embodiments, the resource server 202 can compare the updated risk score 213 for the application 208 to a listing of resources 206. The listing of resources 206 can include a required risk score or risk threshold that an application 208 needs to have to get access to the respective resource 206. For example, the resource server 202 can determine that the risk score 213 for the application 208 is less than a risk threshold for the multi-tenant environment 200. The resource server 202 can modify the value of the second allocation of resource tokens 218 for the application 208 responsive to the determination. In some embodiments, the resource server 202 can use the listing of resources 206 to identify one or more additional resources 206 to provide the application 208 access to. The resource server 202 can generate resource tokens 218 and map the resource tokens 218 to the one or more additional resources 206. The resource server 202 can allocate the new resource tokens 218 mapped to the one or more additional resources 206 to the respective application 208 responsive to the decrease in the risk score 213 for the respective application 208.

In some embodiments, the resource server 202 can increase an access level to one or more resources 206 that the respective application 208 currently has access to, for example, through one or more resource tokens 218. The resource server 202 can modify the resource tokens 218 mapped to the one or more resources 206 to indicate the increase in the access level for the application 208. In some embodiments, the resource server 202 can generate new resource tokens mapped to the one or more resources 206. The new resource tokens 218 can indicate the increase in the access level for the application 208. The resource server 202 can allocate the new resource tokens 218 to the respective application responsive to the decrease in the risk score 213 for the respective application 208. In some embodiments, the resource server 202 can dynamically increase the value of the second allocation of resource tokens 218 for the application 208 responsive to a decrease in the risk score 213 provided by the risk model 212. For example, the resource server 202 can dynamically modify the number of resource tokens 218 allocated to an application 208 responsive to changes in the risk score 213.

Referring now to operation (370), and in some embodiments, responsive to no change in the risk score, the allocation of resource tokens can be maintained at a current level. The resource server 202 can determine that the risk score 213 for an application 208 has not changed and that the risk level of the respective application 208 is at the same level. Thus, the resource server 202 can determine not to change the number of resources 206 that respective application 208 has access to. The resource server 202 can determine not to change an access level to one or more resources 206 that the applications currently has access to. The resource server 202 can determine not to change or maintain the current number of resource tokens 218 allocated to the respective application 208 responsive to determine that the risk score 213 for the respective application 208 did not change.

Referring now to operation (375), and in some embodiments, responsive to an increase in the risk score 213, the allocation of resource tokens 218 can be decreased. The resource server 202 can determine that the risk score 213 for an application has increased thus indicating that a risk level of the respective application 208 has increased. The resource server 202 can provide the respective application 208 access to less resources 206 of the multi-tenant environment 200. For example, the resource server 202 can identify existing resources 206 that the application 208 currently has access to and determine that, based on the new increased risk score 213, access to the one or more resources 206 for the application 208 should be revoked or blocked. The resource server 202 can revoke resource tokens 218 mapped to the one or more resources 206 to revoke access to the one or more resources 206. The resource server 202 can allocate the new resource tokens 218 for the application 208 that replace a previous one or more resource tokens 218 allocated to the application 208. The new resource tokens 218 may not include resource tokens 218 mapped to the one or more resources 206 that access has been revoked for the application 208 responsive to the increase in the risk score 213 for the application 208.

In some embodiments, the resource server 202 can compare the updated risk score 213 for the application 208 to a listing of resources 206 that includes a required risk score to get access to the respective resource 206. The resource server 202 can use the listing of resources 206 to determine which resources 206 that access to should be revoked or blocked for the application 208 responsive to the increase in the risk score 213. The resource server 202 can generate new resource tokens 218 for the application 208 that replace a previous one or more resource tokens 218 allocated to the application 208. The new resource tokens 218 may not include resource tokens 218 mapped to the one or more resources 206 that access has been revoked for the application 208 responsive to the increase in the risk score 213 for the application 208.

In some embodiments, the resource server 202 can decrease an access level to one or more resources 206 that the respective application 208 currently has access to, for example, through one or more resource tokens 218. The resource server 202 can modify the resource tokens 218 mapped to the one or more resources 206 to indicate the decrease in the access level for the application 208. In some embodiments, the resource server 202 can generate new resource tokens mapped to the one or more resources 206. The new resource tokens 218 can indicate the decrease in the access level for the application 208. The resource server 202 can allocate the new resource tokens 218 to the respective application responsive to the increase in the risk score 213 for the respective application 208. In some embodiments, the resource server 202 can dynamically decrease the value of the second allocation of resource tokens 218 for the application 208 responsive to an increase in the risk score 213 provided by the risk model 212.

Referring now to operation (360), and in some embodiments, a determination can be made whether the value score 215 changed. For example, the resource server 202 can make a determination whether the value score 215 for an application 208 increased from a previous value score 215, decreased from a previous value score 215 or stayed the same as a previous value score 215. The resource server 202 can compare the most recent value score 215 to a previous or last value score 215 to make the determination.

Referring now to operation (365), and in some embodiments, responsive to an increase in the value score 215, the allocation of resource tokens 218 can be increased. The resource server 202 can determine that the value score 215 for an application 208 has increased. The increase in the value score 215 can indicate that a value level of the respective application 208 has increased. The resource server 202 can provide the respective application 208 access to more resources 206 of the multi-tenant environment 200. For example, the resource server 202 can identify new resources 206 that the application 208 does not have access and generate resource tokens 218 mapped to the new resources 206 that the application 208 does not have access to. The resource server 202 can allocate the new resource tokens 218 mapped to the one or more additional resources 206 to the respective application 208 responsive to the increase in the value score 215 the respective application 208.

In some embodiments, the resource server 202 can compare the updated value score 215 for the application 208 to a listing of resources 206 that includes a value threshold or a required value score to get access to the respective resource 206. For example, the resource server 202 can determine that the value score 215 for the application 208 is greater than a value threshold for the multi-tenant environment 200. The resource server 202 can modify (e.g., increase) the value of the second allocation of resource tokens 218 for the application 208 responsive to the determination. The resource server 202 can use the listing of resources 206 to identify one or more additional resources 206 to provide the application 208 access to. The resource server 202 can generate resource tokens 218 and map the resource tokens 218 to the one or more additional resources 206. The resource server 202 can allocate the new resource tokens 218 mapped to the one or more additional resources 206 to the respective application 208 responsive to the increase in the value score 215 for the respective application 208.

In some embodiments, the resource server 202 can increase an access level to one or more resources 206 that the respective application 208 currently has access to, for example, through one or more resource tokens 218. The resource server 202 can modify the resource tokens 218 mapped to the one or more resources 206 to indicate the increase in the access level for the application 208. In some embodiments, the resource server 202 can generate new resource tokens mapped to the one or more resources 206. The new resource tokens 218 can indicate the increase in the access level for the application 208. The resource server 202 can allocate the new resource tokens 218 to the respective application responsive to the increase in the value score 215 for the respective application 208. In some embodiments, the resource server 202 can dynamically increase the value of the second allocation of resource tokens 218 for the application 208 responsive to an increase in the value score 215 provided by the value model 214. For example, the resource server 202 can dynamically modify the number of resource tokens 218 allocated to an application 208 responsive to changes in the value score 215.

Referring now to operation (370), and in some embodiments, responsive to no change in the value score 215, the allocation of resource tokens 218 can be maintained at a current level. The resource server 202 can determine that the value score 215 for an application 208 has not changed and that the value level of the respective application 208 is at the same level. Thus, the resource server 202 can determine not to change the number of resources 206 that respective application 208 has access to. The resource server 202 can determine not to change an access level to one or more resources 206 that the applications currently has access to. The resource server 202 can determine not to change or maintain the current number of resource tokens 218 allocated to the respective application 208 responsive to determine that the value score 215 for the respective application 208 did not change.

Referring now to operation (375), and in some embodiments, responsive to a decrease in the value score 215, the allocation of resource tokens 218 can be decreased. The resource server 202 can determine that the value score 215 for an application 208 has increased thus indicating that a value level of the respective application 208 has decreased. The resource server 202 can provide the respective application 208 access to less resources 206 of the multi-tenant environment 200. For example, the resource server 202 can identify existing resources 206 that the application 208 currently has access to and determine that, based on the new decreased value score 215, access to the one or more resources 206 for the application 208 should be revoked or blocked. The resource server 202 can revoke resource tokens 218 mapped to the one or more resources 206 to revoke access to the one or more resources 206. The resource server 202 can allocate the new resource tokens 218 for the application 208 that replace a previous one or more resource tokens 218 allocated to the application 208. The new resource tokens 218 may not include resource tokens 218 mapped to the one or more resources 206 that access has been revoked for the application 208 responsive to the decrease in the value score 215 for the application 208.

In some embodiments, the resource server 202 can compare the updated value score 215 for the application 208 to a listing of resources 206 that includes a required value score to get access to the respective resource 206. The resource server 202 can use the listing of resources 206 to determine which resources 206 that access to should be revoked or blocked for the application 208 responsive to the decrease in the value score 215. The resource server 202 can generate new resource tokens 218 for the application 208 that replace a previous one or more resource tokens 218 allocated to the application 208. The new resource tokens 218 may not include resource tokens 218 mapped to the one or more resources 206 that access has been revoked for the application 208 responsive to the decrease in the value score 215 for the application 208.

In some embodiments, the resource server 202 can decrease an access level to one or more resources 206 that the respective application 208 currently has access to, for example, through one or more resource tokens 218. The resource server 202 can modify the resource tokens 218 mapped to the one or more resources 206 to indicate the decrease in the access level for the application 208. In some embodiments, the resource server 202 can generate new resource tokens mapped to the one or more resources 206. The new resource tokens 218 can indicate the decrease in the access level for the application 208. The resource server 202 can allocate the new resource tokens 218 to the respective application responsive to the decrease in the value score 215 for the respective application 208. In some embodiments, the resource server 202 can dynamically decrease the value of the second allocation of resource tokens 218 for the application 208 responsive to a decrease in the value score 215 provided by the value model 214. For example, the resource server 202 can dynamically modify the number of resource tokens 218 allocated to an application 208 responsive to changes in the value score 215.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for resource appropriation in a multi-tenant computing environment, the method comprising:
    (a) assigning, by a server, a first allocation of resource tokens to an application of a plurality of applications in a multi-tenant computing environment, the resource tokens corresponding to access privileges to a plurality of resources of the multi-tenant computing environment allocated for use by the application to execute the application, and the multi-tenant computing environment receiving a plurality of requests from a plurality of clients for the plurality of applications;
    (b) monitoring, by the server, requests executed by the application using the resource tokens and the plurality of resources corresponding to the resource tokens, the requests received by one or more clients of the plurality of clients;
    (c) determining, by the server, metrics corresponding to the requests executed by the application, the metrics comprising characteristics of the requests and characteristics of execution by the application;
    (d) generating, by the server, a risk model to identify a risk score for the application using the request characteristics and the execution characteristics;
    (e) generating, by the server, a value model to identify a value score for the application using properties of the application and properties of the one or more clients of the plurality of clients that generated the requests, the value score being a different type of score than the risk score, and the properties of the one or more clients including an importance score for a respective client; and
    (f) determining, by the server, a second allocation of the resource tokens for the application, wherein (1) the second allocation increases in comparison to the first allocation responsive to an increase in the value score provided by the value model, or (2) the second allocation decreases in comparison to the first allocation responsive to an increase in the risk score.

2. The method of claim 1, wherein (a) further comprises mapping, by the server, each of the resource tokens to at least one resource of the plurality of resources.

3. The method of claim 1, wherein (c) further comprises determining, by the server, the metrics corresponding to the requests executed by the application in real-time.

4. The method of claim 1, wherein (c) further comprises:
    determining a processing duration value and a memory utilization profile for the application corresponding to the requests executed by the application; and
    generating a request history profile for the application.

5. The method of claim 1, wherein (c) further comprises:
    generating a client application profile for the application corresponding to a listing of clients interacting with the application.

6. The method of claim 1, wherein (c) further comprises:
    determining the metrics corresponding to the requests over a predetermined time period; aggregating the metrics for the predetermined time period into a data set; and
    providing the data set as an input to the risk model to identify the risk score for the application based on the predetermined time period.

7. The method of claim 1, wherein (d) further comprises:
    generating, by the server, a resource token usage profile for each of the plurality of resource tokens; and
    providing, by the server, the resource token usage profile for the resource tokens as at least one input for the risk model.

8. The method of claim 1, wherein (e) further comprises:
    identifying, by the server, the properties of the one or more clients of the plurality of clients from a client database, the properties including at least one of: an account type of the respective client, and a resiliency profile for the respective client.

9. The method of claim 1, wherein (f) further comprises dynamically increasing the second allocation of resource tokens for the application responsive to the increase in the value score provided by the value model.

10. The method of claim 1, wherein (f) further comprises dynamically decreasing the second allocation of resource tokens for the application responsive to the increase in the risk score provided by the risk model.

11. The method of claim 1, further comprising:
    determining, by the server, that the risk score for the application is less than a risk threshold for the multi-tenant computing environment; and modifying, by the server, the second allocation of resource tokens for the application responsive to the determination.

12. The method of claim 1, further comprising:
determining, by the server, that the value score for the application is greater than a value threshold for the multi-tenant computing environment; and
modifying, by the server, the second allocation of resource tokens for the application responsive to the determination.

13. A system for resource appropriation in a multi-tenant computing environment, the system comprising:
a server comprising one or more processors, coupled to memory, the server configured to:
assign a first allocation of resource tokens to an application of a plurality of applications in a multi-tenant computing environment, the resource tokens corresponding to access privileges to a plurality of resources of the multi-tenant computing environment allocated for use by the application to execute the application, and the multi-tenant computing environment receiving a plurality of requests from a plurality of clients for the plurality of applications;
monitor requests executed by the application using the resource tokens and the plurality of resources corresponding to the resource tokens, the requests received by one or more clients of the plurality of clients;
determine metrics corresponding to the requests executed by the application, the metrics comprising characteristics of the requests and characteristics of execution by the application;
generate a risk model to identify a risk score for the application using the request characteristics and the execution characteristics;
generate a value model to identify a value score for the application using properties of the application and properties of the one or more clients of the plurality of clients that generated the requests, the value score being a different type of score than the risk score, and the properties of the one or more clients including an importance score for a respective client; and
determine a second allocation of the resource tokens for the application, wherein (1) the second allocation increases in comparison to the first allocation responsive to an increase in the value score provided by the value model, or (2) the second allocation decreases in comparison to the first allocation responsive to an increase in the risk score.

14. The system of claim 13, wherein the server is further configured to:
determine a processing duration value and a memory utilization profile for the application corresponding to the requests executed by the application; and
generate a request history profile for the application.

15. The system of claim 13, wherein the server is further configured to:
generate a resource token usage profile for each of the plurality of resource tokens; and provide the resource token usage profile for the resource tokens as at least one input for the risk model.

16. The system of claim 13, wherein the server is further configured to:
identify the properties of the one or more clients of the plurality of clients from a client database, the properties including at least one of: an account type of the respective client, and a resiliency profile for the respective client.

17. The system of claim 13, wherein the server is further configured to:
dynamically increase the value of the second allocation of resource tokens for the application responsive to an increase in the value score provided by the value model.

18. The system of claim 13, wherein the server is further configured to:
dynamically decrease the second allocation of resource tokens for the application responsive to the increase in the risk score provided by the risk model.

19. The system of claim 13, wherein the server is further configured to:
determine that the risk score for the application is less than a risk threshold for the multi-tenant computing environment; and
modify the second allocation of resource tokens for the application responsive to the determination.

20. The system of claim 13, wherein the server is further configured to:
determine that the value score for the application is greater than a value threshold for the multi-tenant computing environment; and
modify the second allocation of resource tokens for the application responsive to the determination.

* * * * *